US011889300B2

(12) United States Patent
Liu et al.

(10) Patent No.: US 11,889,300 B2
(45) Date of Patent: Jan. 30, 2024

(54) PRIVACY PROTECTION MECHANISMS FOR CONNECTED VEHICLES

(71) Applicant: INTEL CORPORATION, Santa Clara, CA (US)

(72) Inventors: Xiruo Liu, Portland, OR (US); Shabbir Ahmed, Beaverton, OR (US); Ralf Graefe, Haar (DE); Christopher Gutierrez, Hillsboro, OR (US); Marcio Juliato, Portland, OR (US); Rafael Rosales, Bavaria (DE); Manoj Sastry, Portland, OR (US); Liuyang Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/547,418

(22) Filed: Dec. 10, 2021

(65) Prior Publication Data
US 2022/0174479 A1 Jun. 2, 2022

Related U.S. Application Data

(63) Continuation of application No. 16/707,544, filed on Dec. 9, 2019, now Pat. No. 11,240,659.

(51) Int. Cl.
*H04W 12/02* (2009.01)
*H04W 12/00* (2021.01)
(Continued)

(52) U.S. Cl.
CPC ......... *H04W 12/02* (2013.01); *H04L 63/0407* (2013.01); *H04L 67/125* (2013.01);
(Continued)

(58) Field of Classification Search
CPC ....... H04W 12/02; H04W 4/40; H04W 12/03; H04W 4/46; H04W 4/029; H04W 4/06;
(Continued)

(56) References Cited

FOREIGN PATENT DOCUMENTS

| CN | 107947942 A | * | 4/2018 | ......... H04L 63/0421 |
|---|---|---|---|---|
| CN | 105141582 B | * | 6/2019 | ............. H04L 63/08 |

(Continued)

OTHER PUBLICATIONS

"Pseudonym Change Strategy Based on the Reputation of the Neighboring Vehicles in VANETs"—Santos-Jaimes et al., Universidad Nacional de Colombia, Oct. 18, 2019 https://www.redalyc.org/journal/496/49663345018/html/ (Year: 2019).*

(Continued)

*Primary Examiner* — Randy A Scott
(74) *Attorney, Agent, or Firm* — KDW Firm PLLC

(57) ABSTRACT

Various embodiments are generally directed to techniques for providing improved privacy protection against vehicle tracking for connected vehicles of a vehicular network. For example, at least one road side unit may: identify a set of vehicles that require pseudonym changes and send an invitation for a pseudonym change event to each of the vehicles, determine at least a total number of the acceptances, determine whether the total number meets or exceeds a predetermined threshold number, send acknowledgement messages to the accepting vehicles if the threshold number is met, and form a vehicle group to coordinate the pseudonym change event during a privacy period. During the privacy period, the RSU and the vehicles may communicate with each other in a confidential and private manner via key-session-based unicast transmission, and coordinate transmission power and vehicle trajectory adjustments to maximize the benefits for safety and obfuscation for privacy.

24 Claims, 8 Drawing Sheets

(51) Int. Cl.
  *H04W 4/40* (2018.01)
  *H04W 12/03* (2021.01)
  *H04W 4/46* (2018.01)
  *H04W 4/029* (2018.01)
  *H04W 4/06* (2009.01)
  *H04L 9/40* (2022.01)
  *H04W 4/08* (2009.01)
  *H04W 4/024* (2018.01)
  *H04L 67/125* (2022.01)
  *H04W 4/80* (2018.01)
  *H04L 67/52* (2022.01)

(52) U.S. Cl.
  CPC ............ *H04L 67/52* (2022.05); *H04W 4/024* (2018.02); *H04W 4/029* (2018.02); *H04W 4/06* (2013.01); *H04W 4/08* (2013.01); *H04W 4/40* (2018.02); *H04W 4/46* (2018.02); *H04W 4/80* (2018.02); *H04W 12/03* (2021.01)

(58) Field of Classification Search
  CPC ......... H04W 4/08; H04W 4/024; H04W 4/80; H04L 67/18; H04L 9/40; H04L 67/52; H04L 67/125; H04L 63/0407
  See application file for complete search history.

(56) References Cited

FOREIGN PATENT DOCUMENTS

| CN | 110034958 A | * | 7/2019 | ............. H04L 63/08 |
| CN | 107947942 B | * | 8/2019 | ......... H04L 63/0421 |
| CN | 112703715 A | * | 4/2021 | ............... G08G 1/22 |
| CN | 112740294 A | * | 4/2021 | ............. H04W 4/40 |

OTHER PUBLICATIONS

"A Survey on Pseudonym Changing Strategies for Vehicular Ad-Hoc Networks"—Boualouache et al., Dept. of Computer Science, USTHB University, Apr. 2017 https://arxiv.org/pdf/1704.00679.pdf (Year: 2017).*

* cited by examiner

*100*

300

PRIVACY PROTECTION MECHANISMS FOR CONNECTED VEHICLES

CROSS-REFERENCE TO RELATED APPLICATIONS

This application is a continuation of, claims the benefit of and priority to previously filed U.S. patent application Ser. No. 16/707,544 filed Dec. 9, 2019, entitled "PRIVACY PROTECTION MECHANISMS FOR CONNECTED VEHICLES", which is hereby incorporated by reference in its entirety.

TECHNICAL FIELD

Embodiments described herein generally relate to providing improved privacy protection against vehicle tracking for connected vehicles.

BACKGROUND

In vehicular networks, vehicles may be configured to communicate with each other (e.g., Vehicle-to-vehicle, V2V) or communicate with roadside infrastructures (Vehicle-to-Infrastructure, V2I). Vehicular networks may be single-hop or multi-hop communication networks and may facilitate the communication of real-time traffic information (e.g., congestion, accidents, construction, etc.) and information associated with individual vehicles (e.g., speed, location, direction of travel, etc.) for various transportation-based use cases, such as accident avoidance and route optimization. However, the constant and frequent exchange of vehicle-related information in these networks may compromise various types of privacy, such as communication privacy of the senders and receivers, orientation privacy related to the location of vehicles, and route privacy related to the movement or travel of the vehicles.

DETAILED DESCRIPTION

Figure 1:
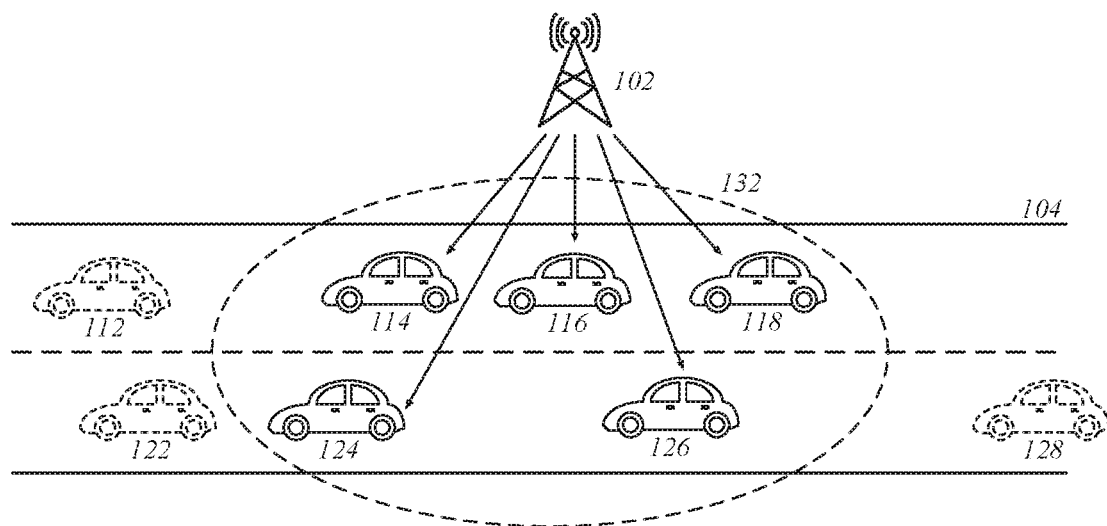
FIG. 1 illustrates a first example vehicle group.

Various embodiments are generally directed to providing improved privacy protection against vehicle tracking for connected vehicles of a vehicular network while allowing sufficient information exchange between the connected vehicles to improve driving safety. In embodiments, at least one road side unit (RSU) may coordinate the formation of a vehicle group and a pseudonym change event via unicast (e.g., with one or more session keys) established between the RSU and each vehicle in the vehicle group to enable confidential vehicle-to-everything (V2X) communication (as opposed to conventional clear text V2X broadcast). In further embodiments, the RSU(s) may coordinate trajectory and transmitter power changes for all the vehicles in the vehicle group to maximize confusion for trackers or attackers while maintaining overall driving safety.

Previous or currently existing solutions may implement something called a "silence period" to conceal or otherwise obstruct a tracker or attacker's ability to track the location or trajectory of connected vehicles. For example, during the silence period, vehicles may be instructed to turn off radio transmitters or to stop sending messages for a predetermined period of time thereby attempting to obfuscate, at least for the period of time, the communication of information that can reveal the location or position of the vehicles. The length of the silence period, however, is very difficult to determine since longer silence periods can compromise driving safety while shorter silence periods do not help to protect privacy. Another existing solution is pseudonym change, wherein instead of a long-term identifier, each vehicle carries a short-term identifier called a pseudonym in the V2X messages. To avoiding being tracked via the long-term identifier, pseudonyms (which are changed periodically or when needed at each vehicle) may be used in plaintext broadcasting messages for improving privacy protection by preventing trackers or attackers linking V2X messages to the vehicle's real long-term identity. However, vehicle tracking may still be possible via trajectory predication or wireless signal "fingerprinting" based on received wireless signal profiles, etc.

The embodiments and examples described herein overcome the above problems and shortcomings of existing solutions. For example, as described above, one or more RSUs may coordinate the formation of a vehicle group (e.g., vehicles that are geographically proximate to each other, vehicles that require pseudonym changes) and facilitate at least pseudonym changes for those vehicles during a "privacy period." In the privacy period, the one or more RSUs may instruct the vehicles in the vehicle group to stop clear text broadcasting and may establish private communications by encrypting messages using session keys with each vehicle to enable protected information sharing while preserving vehicle privacy. The RSU(s) may also implement confidentiality-protected unicast to deliver driving data (e.g., trajectory changes, signal power changes, information pertaining to the pseudonym change, etc.) to each vehicle during the privacy period. Accordingly, privacy protection for the connected vehicles is externally robust (e.g., preventing outsiders from tracking the vehicles) and internally robust (e.g., preventing insiders from tracking peer vehicles via V2X messages).

FIG. 1 illustrates an example vehicle group 100 according to one or more embodiments of the disclosure. As shown, at least one road side unit (RSU) 102 may be arranged near a highway 104. Numerous vehicles may travel on the highway 104, such as vehicles 112, 114, 116, 118, 122, 124, 126, and 128. The vehicles may be interconnected to form at least a portion of a vehicular network. As will be further described below, RSUs may broadly include any computing device that is configured to provide or facilitate network connectivity to passing or surrounding vehicles.

Although FIG. 1 illustrates the RSU 102 being arranged at a side of the highway 104, it may be understood that the RSU 102 may be arranged anywhere (e.g., top, bottom, etc.) near the highway or in any fashion that allows the RSU to communicate with the vehicles (and vice versa). Moreover, it may be understood that the vehicles connected to the vehicular network may not be limited to motor-based vehicles (e.g., gas, diesel, electric), but may be any suitable vehicle configured to perform V2X communications, such as railed vehicles (e.g., trains, trams), watercrafts (e.g., ships, boats), and the like.

In embodiments, the RSU 102 may identify a set of vehicles to form a vehicle group. For example, in order for a vehicle to be included in the vehicle group, one or more criteria may be required to be met. One example criterion may be that the vehicle requires a pseudonym change. For instance, the vehicle may be required to change its pseudonym if the pseudonym has not been rolled or changed for a predefined period of time. In another instance, a pseudonym change may be required if there is a privacy leak associated with that vehicle, a privacy leak related to the pseudonym, or a privacy leak in the network that the vehicle is connected to. Other reasons for pseudonym changes may be possible, such as scheduled changes, requested changes, etc.

Another example criterion may be that the vehicles are geographically close to each other. For instance, the geographical proximity of the vehicles may be determined based on algorithms, such as K-mean clustering, density-based computations, etc. In other instances, any vehicle within a predefined threshold distance from the RSU 102 may meet the proximity requirement.

As shown, the RSU 102 may determine that vehicles 114, 116, 118, 124, and 126 meet one or more of the above-described criteria, and thus, may initiate the formation of vehicle group 132. The RSU 102 may also determine, for example, that vehicles 112, 122, and 128 do not require pseudonym changes and may be excluded from the vehicle group 132, as indicated by the dashed-lines. Upon identifying the vehicles to include in the vehicle group, the RSU may coordinate the formation of the vehicle group with the vehicles so that the vehicles can enter into a privacy period and change pseudonyms together.

Figure 2:
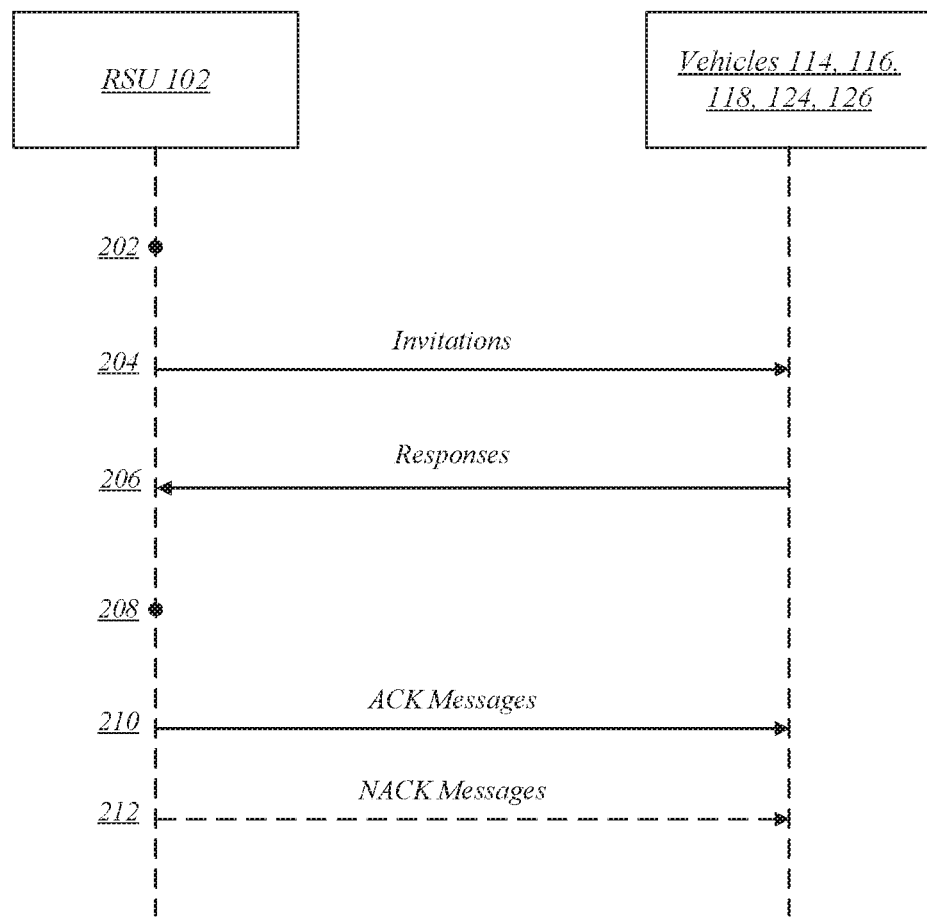
FIG. 2 illustrates a first example timing diagram.

FIG. 2 illustrates an example timing diagram 200 of coordinating the formation of a vehicle group for a pseudonym change event according to one or more embodiments of the disclosure. For example, the pseudonym change event may be understood to broadly refer to any planned occasion for changing the pseudonyms of the vehicles in the vehicle group together at a specific time and location. For ease of explanation, the components illustrated in FIG. 1 (e.g., RSU 102, vehicles 112 to 128, etc.) will be used to explain aspects or features associated with the timing diagram 200.

At time 202, the RSU 102 may identify a set of vehicles to include in a vehicle group. As described above, the RSU 102 may determine that at least vehicles 114, 116, 118, 124, and 126 meet one or more criteria (e.g., require pseudonym changes, close proximity) to include in vehicle group 132 for the pseudonym change event, while vehicles 112, 122, and 128 do not meet the one or more criteria and are excluded from the group. It may be understood that the number of vehicles in the identified set of vehicles should be large enough to reduce the probability of vehicle tracking to a reasonably low value. Thus, for example, if the number of the vehicles in the set is not a predefined number or greater, the RSU 102 may discontinue the vehicle group formation process.

At time 204, the RSU 102 may determine a time and a location for the pseudonym change event and send—via broadcast or multicast—invitations to the identified set of vehicles 114, 116, 118, 124, and 126 to join the pseudonym change event. Each of the invitations may include the determined time and location. In examples, the location may be a place having high, dynamic traffic, such as an entrance or an exit of a highway, a busy intersection, etc. In further examples, the selected time may be a time (or a duration of time) that sufficiently allows the vehicles to complete the process of joining the vehicle group or a time that does not compromise (or justified with respect to) driving safety, etc.

At time 206, each of the vehicles 114, 116, 118, 124, and 126 may reply to invitations by sending a response message indicating that the vehicle accepts the invitation and will join the pseudonym change event. The response message may be sent to the RSU 102 via unicast transmission such that, for example, the vehicles do not know which of the other vehicles have accepted the invitation.

At time 208, the RSU 102 may determine which of the vehicles 114, 116, 118, 124, and 126 have accepted the invitation for the pseudonym event (which may otherwise be referred to as "accepting vehicles") and a total number of invitation acceptances or positive responses (e.g., response indicating that the vehicle will join the pseudonym change event). Further, in examples, the RSU 102 may determine whether the number of acceptances meets or exceeds a predetermined threshold acceptance number (e.g., quota). Since not all of the vehicles 114, 116, 118, 124, 126 may accept the invitation to join the pseudonym event, the predetermined threshold acceptance number may be set to at least ensure that there are enough vehicles undergoing pseudonym changes for the pseudonym change event to make sense in terms of sufficiently protecting privacy while preserving driving safety.

At time 201, if the number of acceptances or positive responses meets or exceeds the predetermined threshold acceptance number, the RSU 102 may broadcast acknowledgement (ACK) messages to the accepting vehicles. At that point, the vehicle group may be officially formed, and the vehicles enter into a privacy period where the RSU 102 can proceed with communicating and coordinating with each vehicle the pseudonym change process, as will be further described below. Thus, in FIG. 1, if all of the vehicles 114, 116, 118, 124, and 126 each accept the pseudonym change event invitation and the RSU 102 determines that the number of accepting vehicles meet or exceed a threshold acceptance number, the vehicle group 132, which includes at least vehicles 114, 116, 118, 124, and 126, can be coordinated and formed.

Alternatively, at time 212, if the number of acceptances or positive responses do not meet the predetermined threshold acceptance number, the RSU 102 may broadcast negative-acknowledgement (NAK or NACK) messages to the accepting vehicles indicating that there will be no pseudonym change event, as shown by the dashed arrow.

Figure 3:
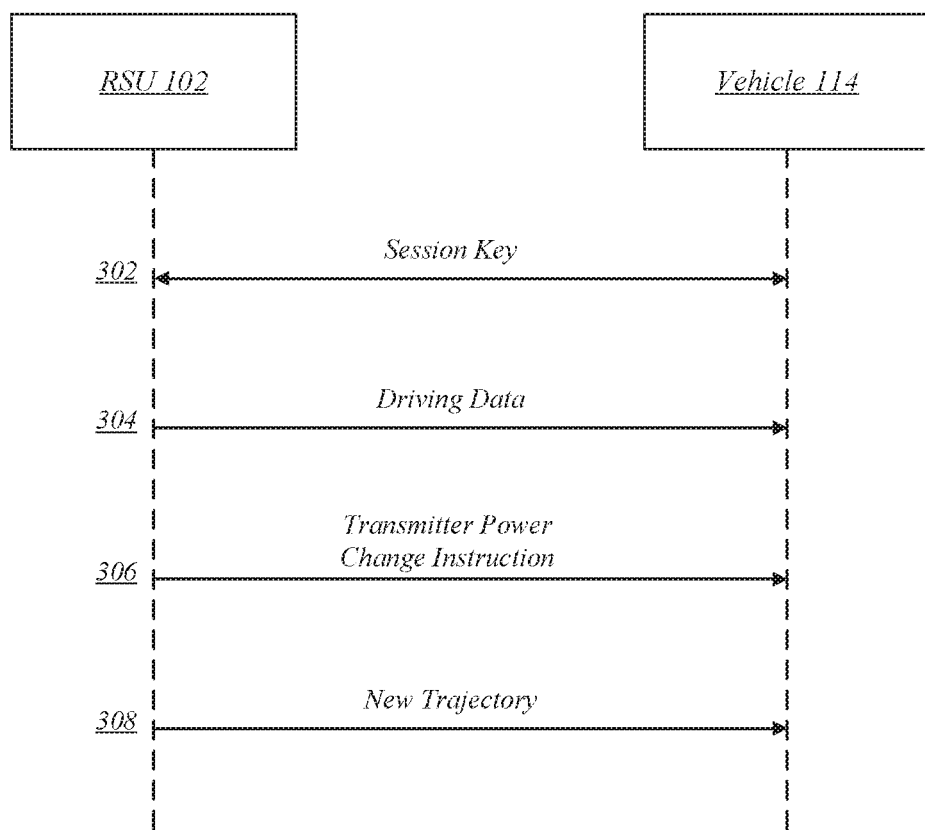
FIG. 3 illustrates a second example timing diagram.

FIG. 3 illustrates an example timing diagram 300 of RSU-vehicle communication during a privacy period according to one or more embodiments of the disclosure. Again, for ease of explanation the components illustrated in FIG. 1 (e.g., RSU 102, vehicles 112 to 128, etc.) will be used to explain aspects or features associated with the timing diagram 300. As shown, for example, the timing diagram 300 illustrates the communication between RSU 102 and vehicle 114.

Upon forming a vehicle group (e.g., vehicle group 132), the vehicles may enter into a privacy period. During the privacy period, the RSU 102 may establish confidential session keys with each vehicle in the vehicle group to enable protected information sharing and increased privacy protection. The session key may establish a confidential communication channel between the RSU 102 and each vehicle. One of the numerous advantages of the privacy period (as opposed to a silence period) is that information between vehicular network nodes (e.g., between an RSU and a connected vehicle) can still be exchanged in a highly confidential and protected manner such that the vehicles, for instance, are extremely difficult to track by both outsiders and insiders (e.g., other vehicles within the vehicle group) while at the same time not compromising driving safety.

At time 302, the RSU 102 may establish a session key with vehicle 114, at which point, the vehicle 114 may communicate with the RSU 102 (or vice versa) via unicast (e.g., one-to-one transmission). The RSU 102 may also instruct vehicle 114 to stop communicating in clear text broadcast. It may be understood that a session key may be a single-use symmetric key used for encrypting one or more messages in a communication session and may also be referred to as content encryption key, traffic encryption key, etc. It may further be understood that other types of keys may be used to establish protected information sharing between the RSU 102 and the vehicle 114.

At time 304, upon establishing the session key with vehicle 114, the RSU 102 may deliver various driving-related data via confidentiality-protected unicast. For example, the driving-related data may include trajectory planning for the vehicle 114 during the pseudonym change. Other driving data such as perception data and the like may also be transmitted in a confidential and protected manner. Moreover, it may be understood that the driving data delivered to vehicle 114 should not include pseudonym change information or other related data associated with the other vehicles in the vehicle group (e.g., vehicles 116, 118, 124, 126), thereby protecting against internal or peer-vehicle tracking.

At time 306, the RSU 102 may instruct vehicle 114 to change its transmitter power from a first power level to a second power level (e.g., higher power, lower power, change within a specified power range, etc.) during the privacy period such that the signal strength indication (RSSI) profile (or any other profile, such as a power profile) associated with the transmitter is obfuscated at a receiving side. In some examples, the RSU 102 may instruct vehicle 114 to change its transmitter power to a specific power level. Because signal strength can vary greatly from application to application and affect functionality in wireless networking differently, wireless devices may often make signal strength measurements available to users and outsiders. For instance, a tracker or attacker may use one or more characteristics associated with a signal strength profile to "fingerprint" that profile to a particular transmitter of a vehicle. Thus, by changing the transmitter power at the vehicle, the vehicle may be able to advantageously obscure its signal strength fingerprint from external or internal trackers or attackers during the privacy period.

In addition, at time 308, the RSU 102 may determine one or more new trajectories for the vehicle 114, select a new trajectory, and instruct vehicle 114 to change or alter its existing or planned trajectory to the new trajectory to further protect against tracking. The vehicle 114 may then adopt the new trajectory during the privacy period. For example, at least portions of the new trajectory may include the moving path from a particular position to the eventual location of the pseudonym change. When selecting a new trajectory for vehicle 114, it may be understood that the RSU 102 may select a trajectory that maximizes both driving safety and overall confusion for a potential tracker or attacker. The new trajectory may be confidentially sent to the vehicle 114 via confidentiality-protected unicast with the session key established at time 302.

In examples, the privacy period may be configured to be any suitable length of time, e.g., a predefined time, as long as the RSU is able to communicate with the vehicles, etc. Unlike the conventional silence period described above, the privacy period does not impose any risk or compromise driving safety the longer it lasts. In fact, vehicles can still communicate on the vehicular network during the privacy period. But the RSU during the privacy period may be coordinating and facilitating ways to guarantee driving safety as well as protect the privacy of the vehicles in the vehicle group against both external or internal tracking or attacks.

Simultaneously or near simultaneously, the RSU may be performing similar or identical types of confidentiality-protected unicast communication (e.g., similar to timing diagram 300) with the other vehicles in the vehicle group (e.g., vehicles 116, 118, 124, 126) to obfuscate signal power and trajectory information. Moreover, it may be understood and possible that the transmitter power change and new trajectory instructions sent at times 304 and 306, respectively, may be information that could be sent as driving data at time 304 and may not be limited to two separate transmissions by the RSU 102 at two separate times, as shown in FIG. 3.

Figure 4:
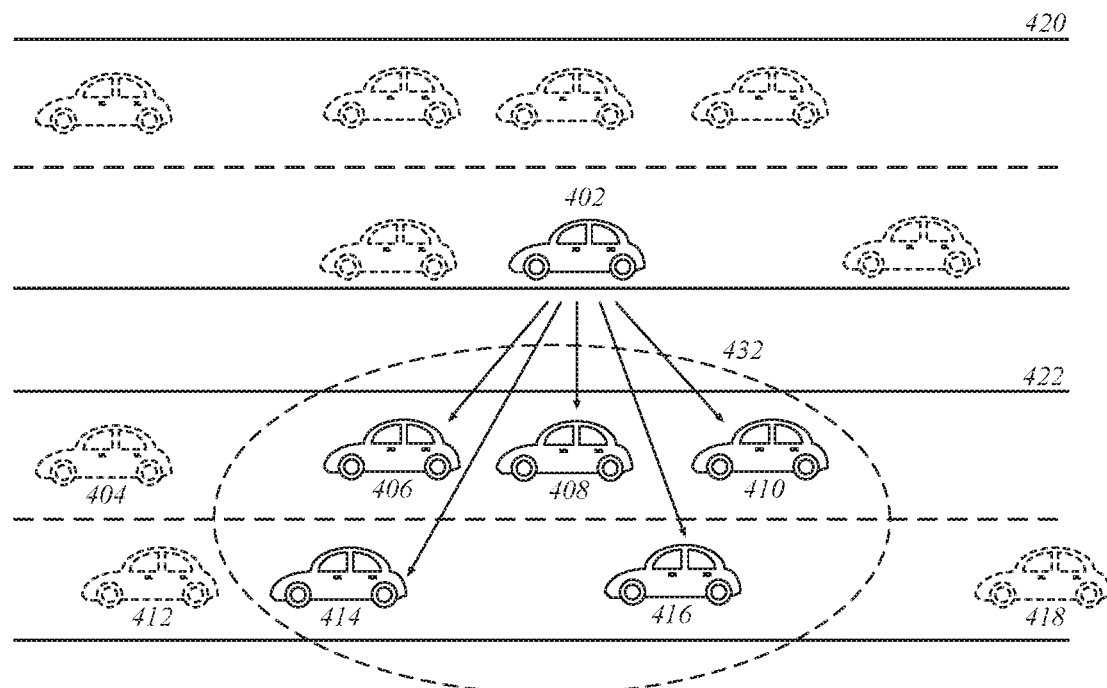
FIG. 4 illustrates a second example vehicle group.

FIG. 4 illustrates an example vehicle group 400 according to one or more embodiments of the disclosure. The vehicle group 400 may be an alternative embodiment to the vehicle group 100 illustrated in FIG. 1. As shown, there may be numerous vehicles, e.g., vehicles 402, 404, 406, 408, 410, 412, 414, 416, 418, traveling on highways 420 and 422.

According to examples, instead of an RSU coordinating the formation of a vehicle group and confidential data sharing with each vehicle for performing a pseudonym change event, a vehicle may do so as a proxy. For instance, vehicle 402 may determine that vehicles 406, 408, 410, 414, and 416 are requisitely close to each other and require pseudonym changes. Similar to the RSU 102 of FIG. 1, the vehicle 402 may broadcast invitations, including a time and a location for the pseudonym change event, to the vehicles 406, 408, 410, 416 via multicast. If there are enough vehicles accepting the invitations, the vehicle 402 may broadcast ACK messages to the vehicles and form a vehicle group 432 that includes at least vehicles 406, 408, 410, 414, and 416. Advantageously, as illustrated in FIG. 4, a pseudonym change event can still take place without an RSU.

Figure 5:
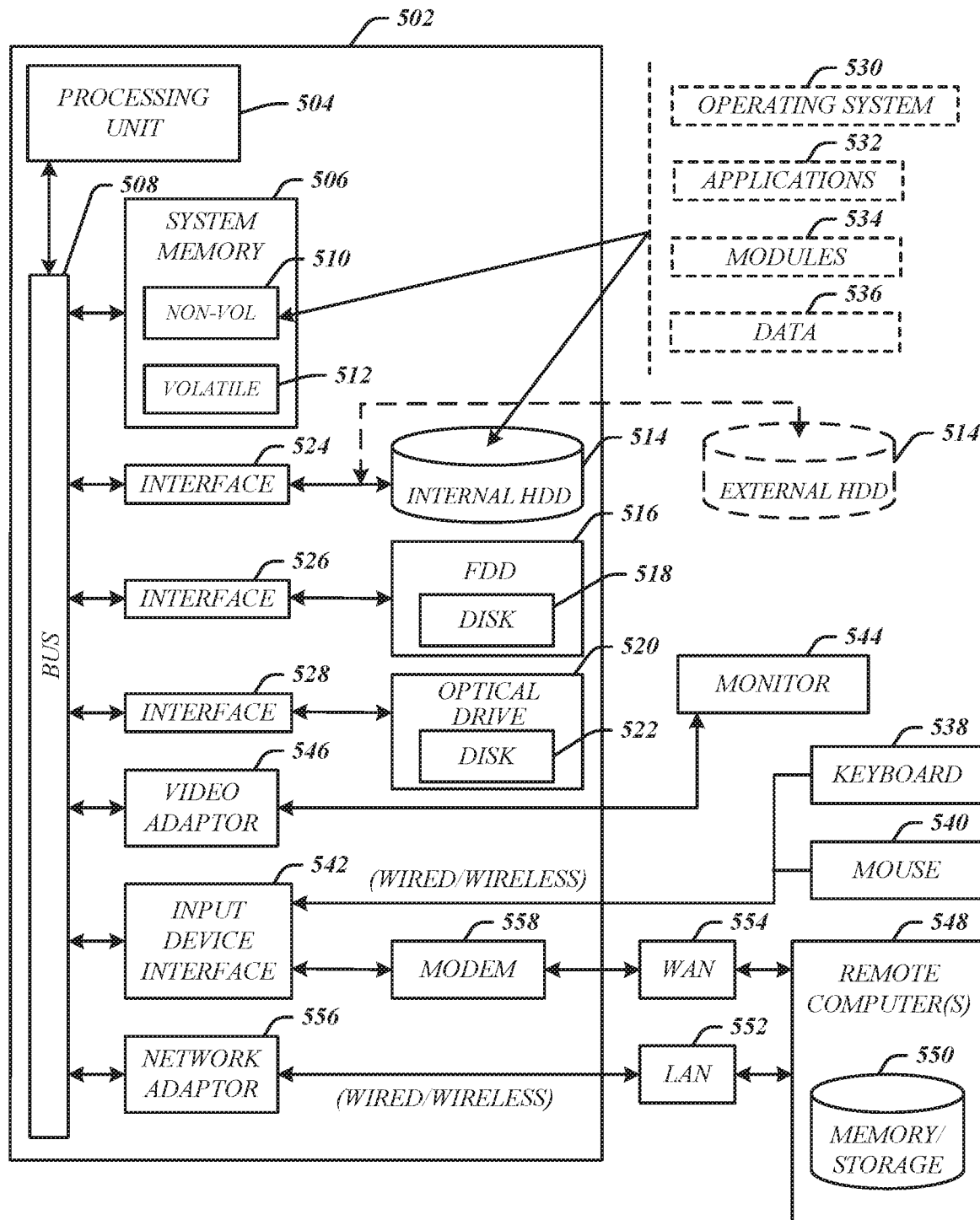
FIG. 5 illustrates an example computing architecture.

FIG. 5 illustrates an example computing architecture 500 (e.g., of a computing device, such as a computer, laptop, tablet computer, mobile computer, smartphone, vehicle-based computing system, etc.) suitable for implementing various embodiments as previously described. Moreover, the computing device may be a computing device in a data center (e.g., server infrastructure, virtualized server infrastructure) and/or may be a cloud-based computer in cloud computing environments. In one embodiment, the computing architecture 500 may include or be implemented as part of a system, which will be further described below. In examples, the computing architecture 500 of the one or more computing devices and the processing circuitries thereof may be configured as components of a vehicle or an RSU.

As used in this application, the terms "system" and "component" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 500.

As shown in this figure, the computing architecture 500 includes a processing unit 504, a system memory 506 and a system bus 508. The processing unit 504 can be any of various commercially available processors.

The system bus 508 provides an interface for system components including, but not limited to, the system memory 506 to the processing unit 504. The system bus 508 can be any of several types of bus structure that may further interconnect to a memory bus (with or without a memory controller), a peripheral bus, and a local bus using any of a variety of commercially available bus architectures. Interface adapters may connect to the system bus 508 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 500 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in this figure, the system memory 506 can include non-volatile memory 510 and/or volatile memory 512. A basic input/output system (BIOS) can be stored in the non-volatile memory 510.

The computer 502 may include various types of computer-readable storage media in the form of one or more lower speed memory units, including an internal (or external) hard disk drive (HDD) 514, a magnetic floppy disk drive (FDD) 516 to read from or write to a removable magnetic disk 518, and an optical disk drive 520 to read from or write to a removable optical disk 522 (e.g., a CD-ROM or DVD). The HDD 514, FDD 516 and optical disk drive 520 can be connected to the system bus 508 by an HDD interface 524, an FDD interface 526 and an optical drive interface 528, respectively. The HDD interface 524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 510, 512, including an operating system 530, one or more application programs 532, other program modules 534, and program data 536. In one embodiment, the one or more application programs 532, other program modules 534, and program data 536 can include, for example, the various applications and/or components of the system 700.

A user can enter commands and information into the computer 502 through one or more wire/wireless input devices, for example, a keyboard 538 and a pointing device, such as a mouse 540. Other input devices may include microphones, infra-red (IR) remote controls, radio-frequency (RF) remote controls, game pads, stylus pens, card readers, dongles, fingerprint readers, gloves, graphics tablets, joysticks, keyboards, retina readers, touch screens (e.g., capacitive, resistive, etc.), trackballs, track pads, sensors, styluses, and the like. These and other input devices are often connected to the processing unit 504 through an input device interface 542 that is coupled to the system bus 508, but can be connected by other interfaces such as a parallel port, IEEE 1394 serial port, a game port, a USB port, an IR interface, and so forth.

A monitor 544 or other type of display device is also connected to the system bus 508 via an interface, such as a video adaptor 546. The monitor 544 may be internal or external to the computer 502. In addition to the monitor 544, a computer typically includes other peripheral output devices, such as speakers, printers, and so forth.

The computer 502 may operate in a networked environment using logical connections via wire and/or wireless communications to one or more remote computers, such as a remote computer 548. The remote computer 548 can be a workstation, a server computer, a router, a personal computer, portable computer, microprocessor-based entertainment appliance, a peer device or other common network node, and typically includes many or all of the elements described relative to the computer 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 is connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computer 502 can include a modem 558, or is connected to a communications server on the WAN 554, or has other means for establishing communications over the WAN 554, such as by way of the Internet. The modem 558, which can be internal or external and a wire and/or wireless device, connects to the system bus 508 via the input device interface 542. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of computing device may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 6:
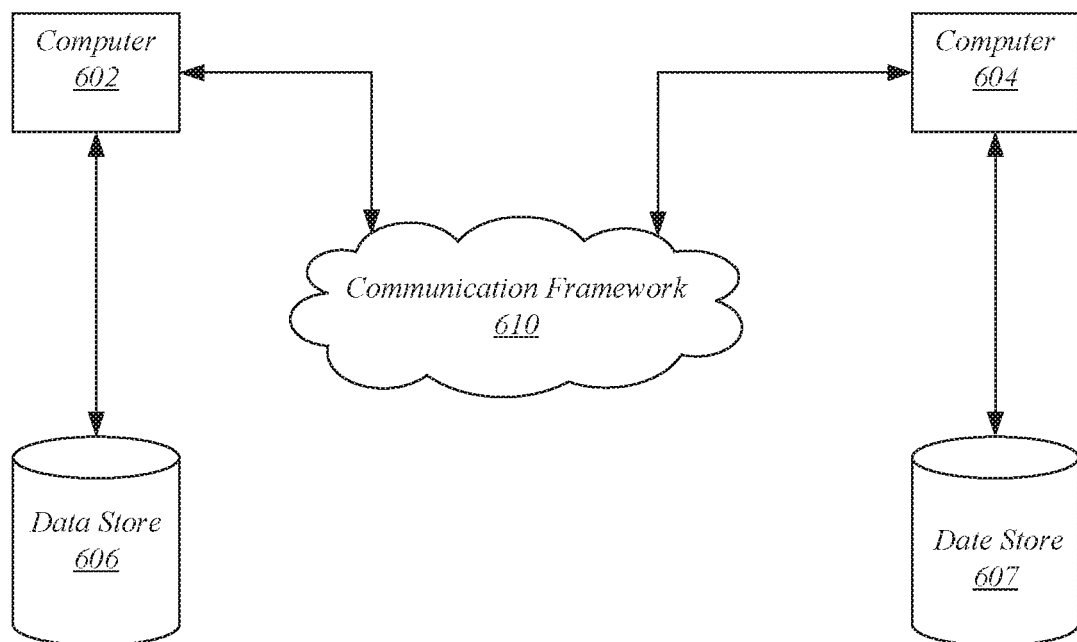
FIG. 6 illustrates an example communications architecture.

FIG. 6 illustrates an exemplary communications architecture 600 suitable for implementing various embodiments. For example, one or more computing devices may communicate with each other via a communications framework 610, which may be a network implemented to facilitate communications during the privacy period and the pseudonym change event for selected vehicles, as described above.

The communications architecture 600 includes various common communications elements, such as a transmitter, receiver, transceiver, radio, network interface, baseband processor, antenna, amplifiers, filters, power supplies, and so forth. The embodiments, however, are not limited to implementation by the communications architecture 600.

As shown in FIG. 6, the communications architecture 600 includes a computer 602 and a computer 604, which are operatively connected to one or more respective client data stores 606 and 607 that can be employed to store information local to the respective computers 602 and servers 604, such as cookies and/or associated contextual information. Furthermore, computers 602 and 604 may be like, or include features like, computing architecture 500.

Computers 602 and 604 may communicate information between each other using a communication framework 610. In one example, computer 602 may be implemented or configured in an RSU, and further, computer 604 may be implemented or configured in a vehicle. The communications framework 610 may implement any well-known communications techniques and protocols. The communications framework 610 may be implemented as a packet-switched network (e.g., public networks such as the Internet, private networks such as an enterprise intranet, and so forth), a circuit-switched network (e.g., the public switched telephone network), a wireless ad hoc network, or a combination of a packet-switched network and a circuit-switched network (with suitable gateways and translators).

The communications framework 610 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, IEEE 802.11 network interfaces and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by computers 602 and 604. A communications network may be any one or combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 7:
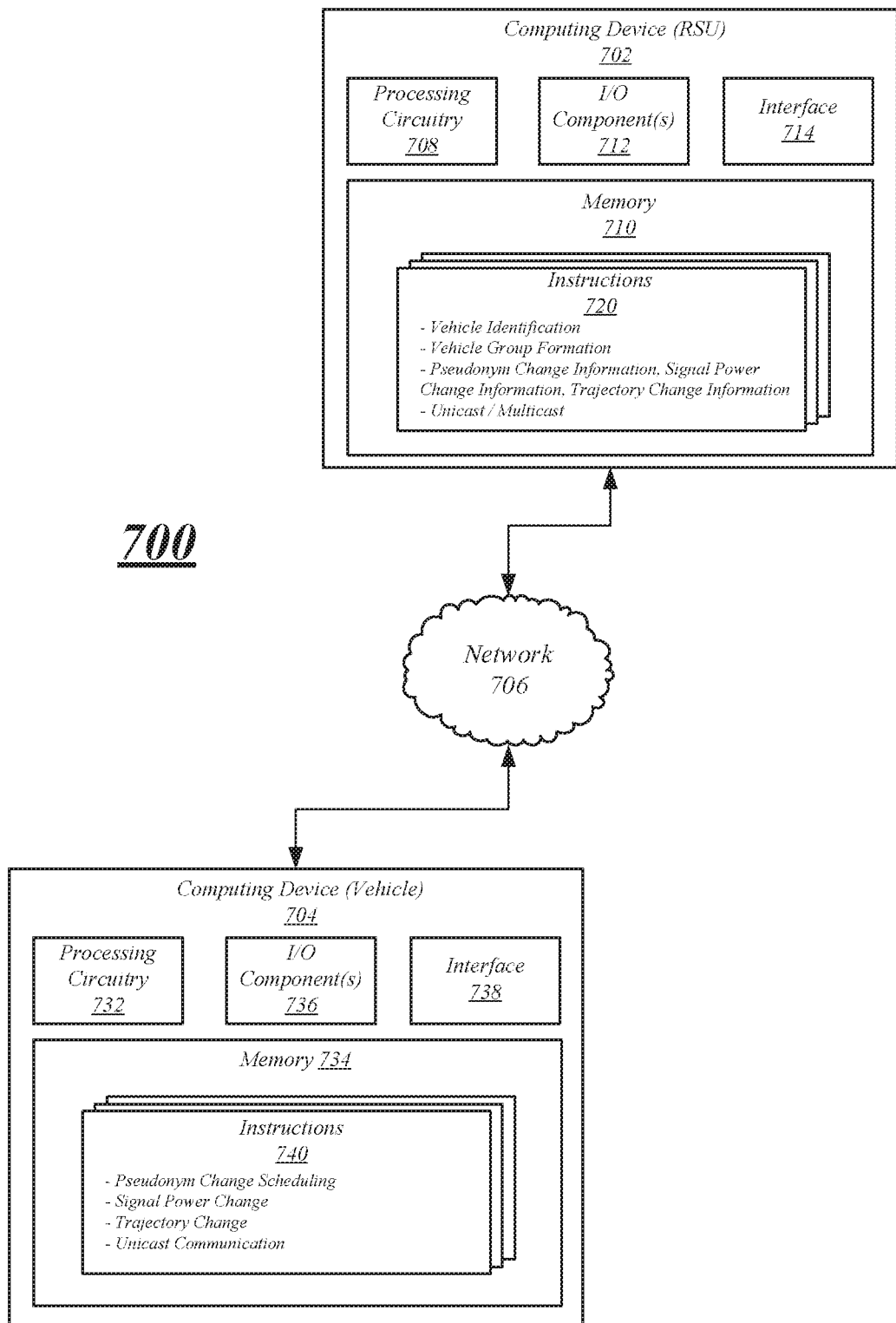
FIG. 7 illustrates an example system.

FIG. 7 illustrates an example system 700 for coordinating and facilitating a pseudonym change event during a privacy period according to embodiments of the present disclosure. As shown, system 700 includes at least one computing device 702 implemented at the RSU side and at least one computing device 704 implemented at the vehicle side, both of which may be connected to each other via network 706. Additional computing devices corresponding to other vehicles may also be connected to the RSU computing device 702 via the network 706. In examples, network 706 could be a local area network (LAN), a wide area network (WAN), vehicular network (e.g., DSRC) or a cellular network (e.g., LTE, 3GPP, or the like). In some embodiments, network 706 could include the Internet.

As illustrated, the RSU computing device 702 may include processing circuitry (e.g., a processor) 708, memory 710, I/O component(s) 712, and interface 714. Memory 710 may store one or more instructions 720 for coordinating the formation of a vehicle group and communicating with each vehicle in the vehicle group to facilitate a pseudonym change event. For example, instructions 720 may include instructions for identifying vehicles (or a set of vehicles) that require pseudonym changes, forming vehicle groups (e.g., determining whether there is a sufficient number of vehicles to form a vehicle group, determining whether there is a sufficient number of vehicles accepting an invitation to a pseudonym change event, etc.), establishing session keys for unicast communication, and communicating information, data, or procedures related to the pseudonym change (e.g., time, location), transmitter signal power change, or trajectory change during a privacy period. Information in the memory 710 and other information stored therein may be accessible by or provided to the processing circuitry 708.

As further illustrated in FIG. 7, the vehicle computing device 704 may include processing circuitry 732, memory 734, I/O components 736, and interface 738. Similar to memory 710 of RSU computing device 702, memory 734 may store various data or information, such as instructions 740, for scheduling pseudonym changes (e.g., instructions related to when a pseudonym expires or is stale, when the pseudonym should be updated, what network components can be trusted, procedures for updating or changing pseudonyms), implementing transmitter signal power changes, trajectory change, and confidentially communicating with external network components, etc. It may be understood that at least portions of the instructions 740 may be provided by the RSU computing device 702. Moreover, the instructions and data stored in memory 734 may be executable or executed by the processing circuitry 732. Other information stored in memory 734 may also be accessible by or provided to the processing circuitry 732. As illustrated in FIG. 7, it may further be understood that multiple sets of instructions 720 may be included in memory 710 and multiple sets of instructions 740 may be included in memory 734.

According to examples, the processing circuitry 708 may include circuitry or processor logic, such as, for example, any of a variety of commercial processors. In some examples, they may include multiple processors, a multi-threaded processor, a multi-core processor (whether the multiple cores coexist on the same or separate dies), and/or a multi-processor architecture of some other variety by which multiple physically separate processors are in some way linked.

The memories 710 and/or 734 may include logic, a portion of which includes arrays of integrated circuits, forming non-volatile memory to persistently store data or a combination of non-volatile memory and volatile memory. It is to be appreciated, that the memories 710 and/or 734 may be based on any of a variety of technologies. In particular, the arrays of integrated circuits included in the memories may be arranged to form one or more types of memory, such as, for example, dynamic random access memory (DRAM), NAND memory, NOR memory, or the like.

The I/O component(s) 712 and/or 736 may include one or more components to provide input to or to provide output from the client computing device 702 and/or the validator computing device 704. For example, the I/O component(s) 712 and/or 736 may be a keyboard (hardware, virtual, etc.), mouse, joystick, microphone, track pad, button, touch layers of a display, haptic feedback device, camera, microphone, speaker, or the like.

Interfaces 714 and/or 738 may include logic and/or features to support a communication interface. For example, they may include one or more interfaces that operate according to various communication protocols or standards to communicate over direct or network communication links. Direct communications may occur via use of communication protocols or standards described in one or more industry standards (including progenies and variants). For example, the interfaces 714 and/or 738 may facilitate communication over a bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like.

While FIG. 7 illustrates the computing device 702 as an RSU computing device, it may be understood that it can be a vehicle computing device if a vehicle performs the coordination and facilitation of the pseudonym change event in privacy mode instead of an RSU, as illustrated in FIG. 4.

Figure 8:
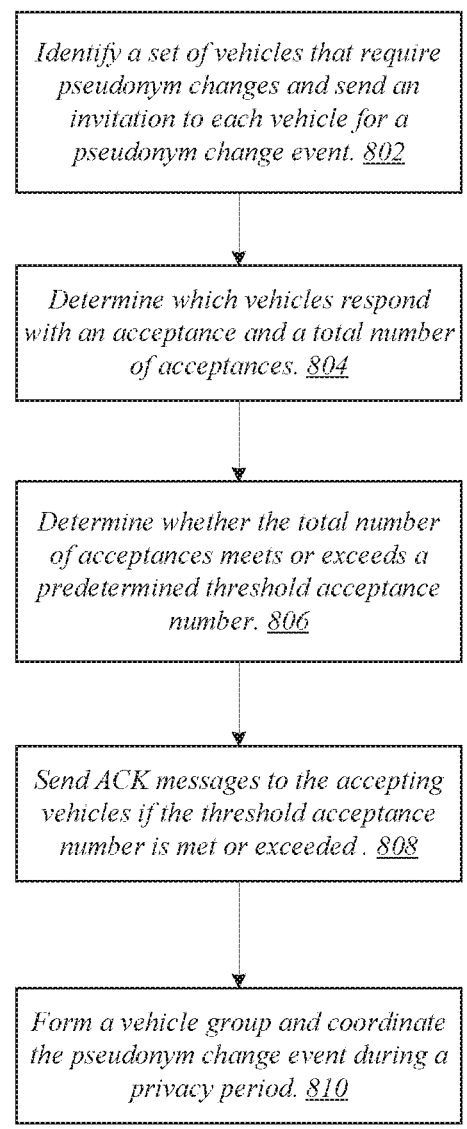
FIG. 8 illustrates an example flow diagram.

FIG. 8 illustrates an example flow diagram 800 according to embodiments of the present disclosure. It may be understood that the features described in each block may be executed by processing circuitry, and further, it may be understood that the blocks are not required to be performed in any specific order.

At block 802, a set of vehicles that require pseudonym changes may be identified. In addition to the vehicles requiring pseudonym changes, the vehicles may need to be requisitely close to each other or close to a coordinating RSU (e.g., within a predefined threshold distance from each other). Upon identifying a set of vehicles, an invitation for a pseudonym change event may be sent to each of those vehicles. The invitation may include at least information related to a specified time and location for the event. As described above, the number of vehicles in the set of vehicles should be large enough to minimize vehicle trackability. If the number is not large enough, the vehicle group formation process may discontinue.

At block 804, a determination may be made regarding which of the vehicles accepted the invitations (may also be known as "accepting vehicles") and how many total acceptances have been received. Thereafter, at block 806, it may be determined whether the total number of acceptances meets or exceeds a predetermined threshold acceptance number. In some situations, it may be possible that only one vehicle in the identified set of vehicles accepts the invitation for the pseudonym change event. Thus, the threshold acceptance number may be a mechanism to ensure that a sufficient number of vehicles accept and are included in the vehicle group.

At block 808, if it is determined that the number of acceptances meets or exceeds the predetermined threshold acceptance number, acknowledgment (ACK) messages may be sent to the accepting vehicles that the pseudonym change event will occur at the specified time and location. Alternatively, if it is determined that the number of acceptances does not meet or exceed the threshold acceptance number, then negative-acknowledgment (NACK) messages may be sent to the accepting vehicles indicating that the pseudonym change event will not occur.

At block 810, based on the determination that the threshold acceptance number has been met or exceeded at block 808, a vehicle group including at least the accepting vehicles may be formed and pseudonym changes may be coordinated during a privacy period. As described above, one of the numerous advantages of the privacy period is that, for example, an RSU can communicate information related to the pseudonym change to a vehicle in a highly confidential and protected manner via confidential unicast. Thus, instead of instructing the vehicle to be silent, the RSU may communicate various types of information or instructions to further obfuscate the vehicle from either external or internal trackers, e.g., by purposefully changing the power level of signal transmission of a vehicle transmitter, changing the trajectory of the vehicle, and so on.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

The disclosure now turns to a number of illustrative examples.

Example 1. An apparatus for coordinating a pseudonym change event, the apparatus comprising: memory to store instructions; and processing circuitry, coupled to the memory, operable to execute the instructions, that when executed, cause the processing circuitry to: identify a set of vehicles that require pseudonym changes; send an invitation for the pseudonym change event to each of the identified vehicles, wherein the invitation includes at least a location and a time for the pseudonym change event; determine (i) which of the vehicles respond with an acceptance to the invitation and (ii) a total number of acceptances; determine whether the total number of acceptances meets or exceeds a predetermined threshold acceptance number; send acknowledgement (ACK) messages to the accepting vehicles if the total number of acceptances meets or exceeds the predetermined threshold acceptance number; and form a vehicle group, the vehicle group including at least the accepting vehicles, and coordinate the pseudonym change event during a privacy period.

Example 2. The apparatus of example 1, wherein the processing circuitry is further caused to determine whether the set of vehicles are within a first predefined distance of each other.

Example 3. The apparatus of example 1, wherein the processing circuitry is further caused to determine whether the set of vehicles are within a second predefined distance from the apparatus.

Example 4. The apparatus of example 2, wherein the processing circuitry is further caused to send the invitation for the pseudonym change event to each of the identified vehicles if the set of vehicles are within the first predefined distance of each other or within the second predefined distance from the apparatus.

Example 5. The apparatus of example 1, wherein the processing circuitry is further caused to send negative-acknowledgement (NACK) messages to the accepting vehicles if the total number of acceptances does not meet the predetermined threshold acceptance number.

Example 6. The apparatus of example 5, wherein the NACK messages indicate at least that the pseudonym change event will not occur.

Example 7. The apparatus of example 1, wherein the pseudonym change event comprises the accepting vehicles to simultaneously change pseudonyms at the specified location and at the specified time.

Example 8. The apparatus of example 1, wherein the processing circuitry is further caused to determine the location of the pseudonym change event, the location having at least high dynamic traffic.

Example 9. The apparatus of examples 1, wherein the coordination of pseudonym change event during the privacy period comprises the processing circuitry to establish a session key with each of the vehicles in the vehicle group via unicast.

Example 10. The apparatus of example 9, wherein the session key is a confidential communication channel between the apparatus and each of the vehicles.

Example 11. The apparatus of example 9, wherein the processing circuitry is further caused to send driving data to each of the vehicle in the vehicle group during the privacy period.

Example 12. The apparatus of example 11, wherein the driving data does not include pseudonym change information for other vehicles in the vehicle group.

Example 13. The apparatus of example 9, wherein the processing circuitry is further caused to instruct each vehicle in the vehicle group to change a transmitter power level from first level to a second level during the privacy period.

Example 14. The apparatus of example 9, wherein the processing circuitry is further caused to determine new trajectories for each vehicle in the vehicle group, select a new trajectory, and instruct each vehicle to change an existing trajectory to the new trajectory during the privacy period.

Example 15. The apparatus of example 1, wherein the apparatus is a road side unit (RSU).

Example 16. The apparatus of example 1, wherein the apparatus is a computing device of a vehicle.

Example 17. The apparatus of example 1, wherein the set of vehicles require the pseudonym changes if the vehicles have not changed pseudonyms for a predefined duration of time or if there is a privacy leak (i) associated with the vehicles or (ii) on a vehicular network the vehicles are connected to.

Example 18. A system comprising the apparatus of any one of examples 1 to 17.

Example 19. A method for coordinating a pseudonym change event, the method comprising: identifying a set of vehicles that require pseudonym changes; sending an invitation for the pseudonym change event to each of the identified vehicles, wherein the invitation includes at least a location and a time for the pseudonym change event; determining (i) which of the vehicles respond with an acceptance to the invitation and (ii) a total number of acceptances; determining whether the total number of acceptances meets or exceeds a predetermined threshold acceptance number; sending acknowledgement (ACK) messages to the accepting vehicles if the total number of acceptances meets or exceeds the predetermined threshold acceptance number; and forming a vehicle group, the vehicle group including at least the accepting vehicles, and coordinating the pseudonym change event during a privacy period.

Example 20. The method of example 19, further comprising determining whether the set of vehicles are within a first predefined distance of each other.

Example 21. The method of example 19, further comprising determining whether the set of vehicles are within a second predefined distance.

Example 22. The method of example 20, further comprising sending the invitation for the pseudonym change event to each of the identified vehicles if the set of vehicles are within the first predefined distance of each other or within a second predefined distance.

Example 23. The method of example 19, further comprising sending negative-acknowledgement (NACK) messages to the accepting vehicles if the total number of acceptances does not meet the predetermined threshold acceptance number.

Example 24. The method of example 23, wherein the NACK messages indicate at least that the pseudonym change event will not occur.

Example 25. The method of example 19, wherein the pseudonym change event comprises the accepting vehicles to simultaneously change pseudonyms at the specified location and at the specified time.

Example 26. The method of example 19, further comprising determining the location of the pseudonym change event, the location having at least high dynamic traffic.

Example 27. The method of example 19, wherein the coordinating of pseudonym change event during the privacy period comprises establishing a session key with each of the vehicles in the vehicle group via unicast.

Example 28. The method of example 27, wherein the session key is a confidential communication channel between the apparatus and each of the vehicles.

Example 29. The method of example 27, further comprising sending driving data to each of the vehicle in the vehicle group during the privacy period.

Example 30. The method of example 29, wherein the driving data does not include pseudonym change information for other vehicles in the vehicle group.

Example 31. The method of example 27, further comprising instructing each vehicle in the vehicle group to change a transmitter power level from first level to a second level during the privacy period.

Example 32. The method of example 27, further comprising determining new trajectories for each vehicle in the vehicle group, select a new trajectory, and instruct each vehicle to change an existing trajectory to the new trajectory during the privacy period.

Example 33. The method of example 19, wherein the apparatus is a road side unit (RSU).

Example 34. The method of example 19, wherein the apparatus is a computing device of a vehicle.

Example 35. The method of example 19, wherein the set of vehicles require the pseudonym changes if the vehicles have not changed pseudonyms for a predefined duration of time or if there is a privacy leak (i) associated with the vehicles or (ii) on a vehicular network the vehicles are connected to.

Example 36. A system for coordinating a pseudonym change event, the system comprising: first processing circuitry, coupled to memory, operable to execute instructions, that when executed, cause the first processing circuitry to: identify a set of vehicles that require pseudonym changes; send an invitation for the pseudonym change event to each of the identified vehicles, wherein the invitation includes at least a location and a time for the pseudonym change event; determine (i) which of the vehicles respond with an acceptance to the invitation and (ii) a total number of acceptances; determine whether the total number of acceptances meets or exceeds a predetermined threshold acceptance number; send acknowledgement (ACK) messages to the accepting vehicles if the total number of acceptances meets or exceeds the predetermined threshold acceptance number; and form a vehicle group, the vehicle group including at least the accepting vehicles, and coordinate the pseudonym change event during a privacy period.

Example 37. The system of example 36, further comprising: second processing circuitry, coupled to memory, operable to execute instructions, that when executed, cause the second processing circuitry to: receive the invitation, determine whether to accept the invitation, and send the acceptance to the invitation; enter into the privacy period; and receive driving-related instructions during the privacy period.

Example 38. The system of example 37, wherein the first processing circuitry is included in a road side unit (RSU) and the second processing circuitry is included in a vehicle of the identified set of vehicles.

Example 39. The system of example 36, wherein the coordination of pseudonym change event during the privacy period comprises the first processing circuitry to establish a session key with each of the vehicles in the vehicle group via unicast, the session key being a confidential communication channel between the apparatus and each of the vehicles.

Example 40. The system of example 39, wherein the first processing circuitry is further caused to send driving data to each of the vehicle in the vehicle group during the privacy period, the driving data not including pseudonym change information for other vehicles in the vehicle group.

Example 41. The system of example 39, wherein the first processing circuitry is further caused to instruct each vehicle in the vehicle group to change a transmitter power level from first level to a second level during the privacy period.

Example 42. The system of example 39, wherein the first processing circuitry is further caused to determine new trajectories for each vehicle in the vehicle group, select a new trajectory, and instruct each vehicle to change an existing trajectory to the new trajectory during the privacy period.

Example 43. At least one machine-readable storage medium comprising instructions that when executed by at least one processor, causes the at least one processor to: identify a set of vehicles that require pseudonym changes; send an invitation for the pseudonym change event to each of the identified vehicles, wherein the invitation includes at least a location and a time for the pseudonym change event; determine (i) which of the vehicles respond with an acceptance to the invitation and (ii) a total number of acceptances; determine whether the total number of acceptances meets or exceeds a predetermined threshold acceptance number; send acknowledgement (ACK) messages to the accepting vehicles if the total number of acceptances meets or exceeds the predetermined threshold acceptance number; and form a vehicle group, the vehicle group including at least the accepting vehicles, and coordinate the pseudonym change event during a privacy period.

Example 44. The at least one machine-readable storage medium of example 43, wherein the coordination of pseudonym change event during the privacy period comprises the instructions further causing the at least one processor to establish a session key with each of the vehicles in the vehicle group via unicast, the session key being a confidential communication channel between the apparatus and each of the vehicles.

Example 45. The at least one machine-readable storage medium of example 44, wherein the instructions further cause the at least one processor to send driving data to each of the vehicle in the vehicle group during the session key of the privacy period, the driving data not including pseudonym change information for other vehicles in the vehicle group.

Example 46. The at least one machine-readable storage medium of example 44, wherein the instructions further cause the at least one processor to instruct each vehicle in the vehicle group to change a transmitter power level from first level to a second level during the privacy period.

Example 47. The at least one machine-readable storage medium of example 44, wherein the instructions further cause the at least one processor to determine new trajectories for each vehicle in the vehicle group, select a new trajectory, and instruct each vehicle to change an existing trajectory to the new trajectory during the privacy period.

Example 48. The at least one machine-readable storage medium of example 43, wherein the instructions further cause the at least one processor to send the invitation for the pseudonym change event to each of the identified vehicles if the set of vehicles are within the first predefined distance of each other or within the second predefined distance from the apparatus.

Example 49. An apparatus comprising means to perform the method of any one of examples 19 to 35.

Example 50. A system comprising means to perform the method of any one of examples 19 to 35.

Example 51. At least one machine-readable storage medium comprising means to perform the method of any one of the examples 19 to 35.

Example 52. An apparatus comprising the at least one machine-readable storage medium of any one of examples 43 to 48.

Example 53. A system comprising the at least one machine-readable storage medium of any one of examples 43 to 48.

What is claimed is:

1. An apparatus, comprising:
   memory to store instructions; and
   processing circuitry, coupled to the memory, operable to execute the instructions, that when executed, cause the processing circuitry to:
      receive an invitation for a pseudonym change event for a set of vehicles, wherein the invitation includes at least a location and a time for the pseudonym change event, and wherein the invitation comprises a clear text multicast transmission;
      send a response to the invitation, wherein the response includes an indication of an acceptance to the invitation, wherein the response comprises a clear text unicast transmission;
      receive an acknowledgement (ACK) message, wherein the ACK message is received responsive to a determination that a number of vehicles, in the set of vehicles, greater than or equal to a threshold level, accepted the invitation;
      join a vehicle group that includes at least the vehicles that accepted the invitation; and
      receive information to change pseudonyms over a confidential communication channel to enable protected information sharing during a privacy period.

2. The apparatus of claim 1, wherein the set of vehicles are within a first predefined distance of each other.

3. The apparatus of claim 1, wherein the processing circuitry is further caused to receive a negative-acknowledgement (NACK) message responsive to a determination that the number of vehicles, in the set of vehicles, is less than the threshold level accepted the invitation.

4. The apparatus of claim 1, wherein the pseudonym change event comprises the accepting vehicles to simultaneously change pseudonyms at the location and at the time.

5. The apparatus of claim 1, wherein the location comprises at least high dynamic traffic.

6. The apparatus of claim 1, wherein the processing circuitry is further caused to receive a session key via unicast.

7. The apparatus of claim 6, wherein the processing circuitry is further caused to receive driving data during the privacy period, the driving data not including pseudonym change information for other vehicles in the vehicle group.

8. The apparatus of claim 1, wherein the processing circuitry is further caused to receive an instruction to change a transmitter power level from first level to a second level during the privacy period.

9. A method, comprising:
receiving an invitation for a pseudonym change event for a set of vehicles, wherein the invitation includes at least a location and a time for the pseudonym change event, and wherein the invitation comprises a clear text multicast transmission;
sending a response to the invitation, wherein the response includes an indication of an acceptance to the invitation, wherein the response comprises a clear text unicast transmission;
receiving an acknowledgement (ACK) message, wherein the ACK message is received responsive to a determination that a number of vehicles, in the set of vehicles, greater than or equal to a threshold level, accepted the invitation;
joining a vehicle group that includes at least the vehicles that accepted the invitation; and
receiving information to change pseudonyms over a confidential communication channel to enable protected information sharing during a privacy period.

10. The method of claim 9, wherein the set of vehicles are within a first predefined distance of each other.

11. The method of claim 9, comprising receiving a negative-acknowledgement (NACK) message responsive to a determination that the number of vehicles, in the set of vehicles, is less than the threshold level accepted the invitation.

12. The method of claim 9, wherein the pseudonym change event comprises the accepting vehicles to simultaneously change pseudonyms at the location and at the time.

13. The method of claim 9, wherein the location comprises at least high dynamic traffic.

14. The method of claim 9, comprising receiving a session key via unicast.

15. The method of claim 14, comprising receiving driving data during the privacy period, the driving data not including pseudonym change information for other vehicles in the vehicle group.

16. The method of claim 9, comprising receiving an instruction to change a transmitter power level from first level to a second level during the privacy period.

17. At least one non-transitory machine-readable storage medium comprising instructions that when executed by at least one processor, causes the at least one processor to:
receive an invitation for a pseudonym change event for a set of vehicles, wherein the invitation includes at least a location and a time for the pseudonym change event, and wherein the invitation comprises a clear text multicast transmission;
send a response to the invitation, wherein the response includes an indication of an acceptance to the invitation, wherein the response comprises a clear text unicast transmission;
receive an acknowledgement (ACK) message, wherein the ACK message is received responsive to a determination that a number of vehicles, in the set of vehicles, greater than or equal to a threshold level, accepted the invitation;
join a vehicle group that includes at least the vehicles that accepted the invitation; and
receive information to change pseudonyms over a confidential communication channel to enable protected information sharing during a privacy period.

18. The at least one non-transitory machine-readable storage medium of claim 17, wherein the set of vehicles are within a first predefined distance of each other.

19. The at least one non-transitory machine-readable storage medium of claim 17, wherein the instructions further cause the at least one processor to receive a negative-acknowledgement (NACK) message responsive to a determination that the number of vehicles, in the set of vehicles, is less than the threshold level accepted the invitation.

20. The at least one non-transitory machine-readable storage medium of claim 17, wherein the pseudonym change event comprises the accepting vehicles to simultaneously change pseudonyms at the location and at the time.

21. The at least one non-transitory machine-readable storage medium of claim 17, wherein the location comprises at least high dynamic traffic.

22. The at least one non-transitory machine-readable storage medium of claim 17, wherein the instructions further cause the at least one processor to receive a session key via unicast.

23. The at least one non-transitory machine-readable storage medium of claim 22, wherein the instructions further cause the at least one processor to receive driving data during the privacy period, the driving data not including pseudonym change information for other vehicles in the vehicle group.

24. The at least one non-transitory machine-readable storage medium of claim 17, wherein the instructions further cause the at least one processor to receive an instruction to change a transmitter power level from first level to a second level during the privacy period.

* * * * *